United States Patent [19]

Sanford

[11] 4,031,957

[45] June 28, 1977

[54] METHOD AND APPARATUS FOR TESTING AND TREATING WELL FORMATIONS

[76] Inventor: Lawrence Sanford, 4047 Hollister, Houston, Tex. 77055

[22] Filed: July 23, 1976

[21] Appl. No.: 708,029

[52] U.S. Cl. .............................. 166/264; 166/184; 166/315; 166/307; 166/317; 166/318

[51] Int. Cl.² .................. E21B 43/00; E21B 43/27; E21B 47/00

[58] Field of Search .......... 166/307, 278, 264, 250, 166/315, 51, 100, 317–319, 332–334, 323

[56] References Cited

UNITED STATES PATENTS

| | | | |
|---|---|---|---|
| 2,947,363 | 8/1960 | Sackett et al. | 166/318 |
| 3,134,439 | 5/1964 | Shields, Jr. | 166/51 |
| 3,351,135 | 11/1967 | Jensen | 166/317 X |
| 3,353,609 | 11/1967 | Jensen | 166/317 X |
| 3,358,755 | 12/1967 | Chisholm | 166/264 |
| 3,358,767 | 12/1967 | Reardon | 166/334 X |
| 3,388,745 | 6/1968 | Cole | 166/317 X |
| 3,422,896 | 1/1969 | Nutter | 166/334 X |
| 3,850,240 | 11/1974 | Conover | 166/264 X |
| 3,976,136 | 8/1976 | Farley et al. | 166/264 |

*Primary Examiner*—Stephen J. Novosad
*Attorney, Agent, or Firm*—Browning, Bushman & Zamecki

[57] ABSTRACT

A single trip method of testing and treating a down hole formation in which conventional drill stem testing can be carried out followed by acidizing or other treatment of the formation without the need to remove the drill stem test string, the method employing a well tool in the operating tool string which allows reverse circulation to clean out the tool string following the initial drill stem test, allows the introduction of acidizing fluid into the formation and permits a second reverse circulation following acidizing and subsequent testing, the well tool being operative without the necessity for rotation of the tool string.

26 Claims, 10 Drawing Figures

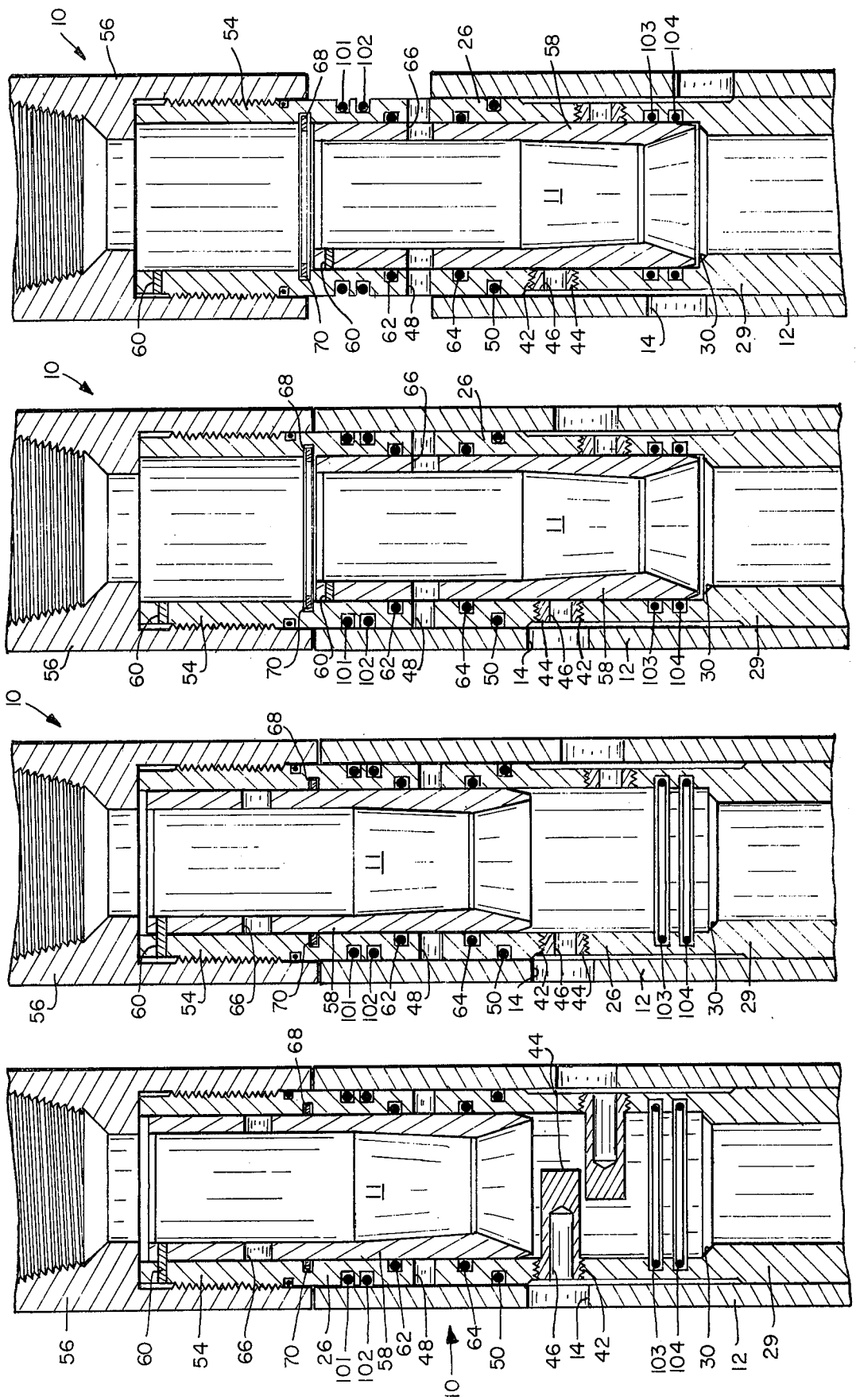

METHOD AND APPARATUS FOR TESTING AND TREATING WELL FORMATIONS

BACKGROUND OF THE INVENTION

The present invention relates to the testing and treatment of down hole formations in oil wells, and, more particularly, to a single trip method for conducting drill stem testing and acidizing and a well tool for use therein.

Drill stem testing provides an extremely accurate method of evaluating down hole formations. In fact, other than actual production from a completed well, drill stem or formation testing is the most reliable technique known for evaluation of the producing capabilities of formations. Procedures and apparatus for carrying out the testing are well documented in the literature. Briefly, the procedure involves opening a section of the well bore, in either open or cased hole, to atmospheric or reduced pressure. To accomplish this, the formation is isolated by a packer which supports the hydrostatic pressure load of the well fluid in the annulus surrounding the tool string. The formation is then exposed through a suitable valving system to atmospheric pressure in the drill pipe such that the formation's ability to produce fluid can be determined.

Acidizing and surfactant treatment is also a widely used and valuable technique. In conventional acidizing, a fluid such as hydrochloric acid is introduced, under pressure, into the formation to stimulate from the formation.

It frequently occurs that many of the formations that are subjected to conventional drill stem testing are of a nature such that acidizing would convey valuable information as to what the producing capabilities of the formation would be if the well were completed. Presently, the most commonly used procedure for drill stem testing and acidizing requires two trips into the well, i.e., one trip for the drill stem testing and a separate trip for the acidizing. It will be readily apparent that such a procedure, requiring dual trips, is quite time consuming and, additionally, is quite costly.

While single trip methods of conducting drill stem testing and acidizing are known, they involve the use of valving systems in the tool string which are operated by relative rotation of the operating string. Such valving systems are relatively complicated and expensive. Additionally, rotation of the tool string necessary to actuate the valving may result in unseating of the packer. Accordingly, a method and apparatus which would permit single trip formation testing and acidizing without the necessity for string rotation is highly desirable.

SUMMARY OF THE INVENTION

It is therefore an object of the present invention to provide an improved method for testing and treating down hole formations in oil wells.

An important object of the present invention is to provide a simple and reliable single trip method for formation testing and acidizing.

Yet another object of the present invention is to provide an improved apparatus for testing and treating a well formation.

A further object of the present invention is to provide a well tool which permits a single trip method of formation testing and acidizing of a well formation and which is operable without the need to rotate the operating tool string in which the tool is supported.

These and other objects of the present invention will become apparent from the drawings, the description given herein and the appended claims.

In one respect the present invention provides a method of treating a formation in a well bore wherein an operating tool string having a packer, a perforated shoe supported below the packer, a first valve means supported above the packer and second valve means supported above the first valve means is lowered into the well bore. The packer is seated above the formation to seal off the latter, the perforated shoe being in open communication with the formation. The first valve means is opened to provide a flow passage from the formation up through the operating tool string to the well head. Following any testing of the formation, the first valve means is closed whereupon the second valve means is opened to provide a lateral flow path from the interior of the tool string to the well bore. The tool string is then cleaned by reverse circulation through the flow path opened through the second valve means following which the second valve means is closed and the first valve means is again opened. A treating fluid such as acid is then introduced into the formation following which the well is permitted to flow to determine the producing capabilities of the formation. The first valve means is then closed and the second valve means is then utilized to open a second lateral flow path providing communication from the interior of the tool string to the well bore, the second flow path being opened by longitudinal movement of the tool string and being used for a second reverse circulation to remove foreign matter from the tool string.

The present invention also provides an apparatus for conducting the above described single trip formation testing and acidizing method, the apparatus including a packer, a perforated shoe supported below the packer, suitable conduit means connecting the shoe and the packer, first valve means supported above the packer and connected thereto by suitable conduit means and second valve means supported above the first valve means and connected thereto by suitable conduit means. The first valve means is operative to selectively provide a flow passage for circulation from the formation to the well head or vice versa once the packer has been set above the formation. The second valve means includes means to provide a first lateral flow path from the interior of the second valve means to the well bore and means to provide a second lateral flow path from the interior of the second valve means to the well bore when the first lateral flow path is closed.

The invention further provides a well tool comprised generally of a tubular body having lateral port means therein. A generally hollow mandrel is telescopically received in the body, the mandrel having a first lateral passageway and means for forming a second lateral passageway longitudinally displaced from the first lateral passageway. The mandrel and body are mounted for relative axial movement between first and second terminal positions and there are valve means disposed within the mandrel to normally close the first lateral passageway. The valve means is also operable to close the second lateral passageway after it has been formed and the second lateral passageway and the lateral port means in the body have been moved into register by relative axial movement to one of the terminal positions. The valve means further includes means to provide a fluid communication path through the first lateral passageway between the interior of the tool and the exterior of the tool upon relative axial movement to the other of the terminal position.

BRIEF DESCRIPTION OF THE DRAWINGS

FIGS. 7–10 are partial elevational, cross-sectional views showing the well tool of FIG. 6 in various modes of operation.

DESCRIPTION OF THE PREFERRED EMBODIMENT

Figure 6:
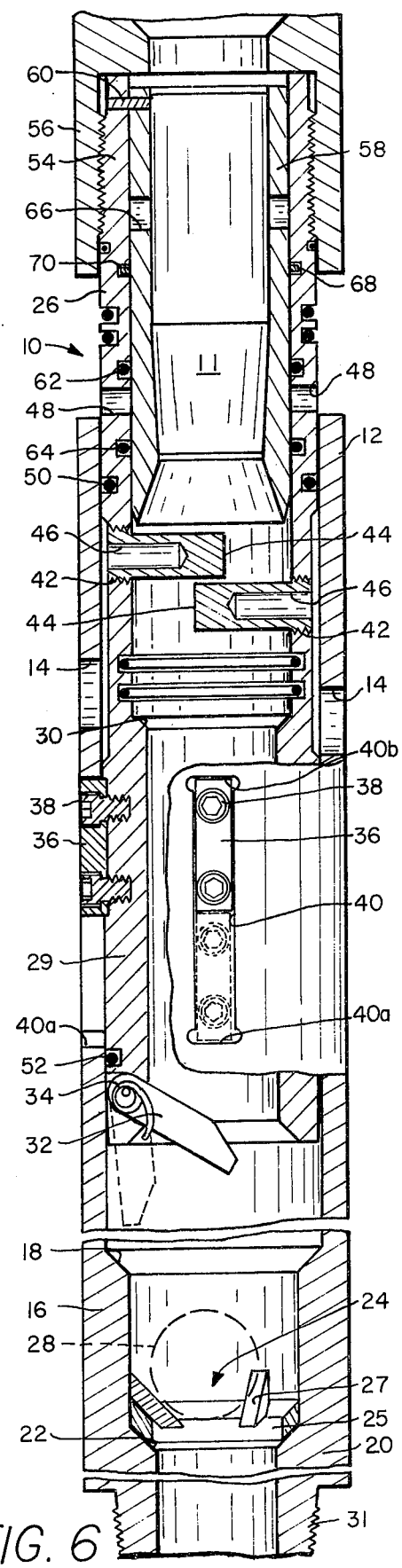
FIG. 6 is a partial cross-sectional, elevational view of the well tool of the present invention.

Referring first to FIG. 6, the well tool, shown generally as 10, defines a generally longitudinal bore 11 and is comprised of a generally tubular body 12 having a series of lateral ports 14 in the wall thereof. Body 12 has an internally upset portion 16 forming an annularly extending abutment shoulder 18. A second internally upset portion 20 below portion 16 and near the lower end of body 12 forms annular shoulder 22. A ball catcher 24 is secured to and rests on shoulder 22. Ball catcher 24 is comprised of a ring 25 having a series of circumferentially spaced projections 27 protruding therefrom to provide a ball seal and prevent a ball 28 from passing downwardly through body 12, while still permitting fluid flow downwardly or upwardly through tool 10. The lower end of body 12 is provided with a threaded pin section 31 for connection to a suitable box member in the operating tool string below tool 10.

Concentrically and slidingly received in body 12 is generally hollow mandrel 26. Mandrel 26 has an internally upset portion 29 forming an annular abutment shoulder 30. A latch 32 pivotally secured to the lower end of mandrel 26 is normally biased in a position shown in full lines by spring 34. Affixed to the outer wall of mandrel 26 is a stop member 36, stop member 36 being secured by bolts 38 received in tapped bores in the wall of mandrel 26. Stop member 36 projects laterally outwardly from mandrel 26 into a longitudinally extending slot 40 having end walls 40a and 40b in the wall of body 12. It will thus be seen that mandrel 26 and body 12 can be moved axially relative to one another between terminal positions determined by the intersection of stop member 36 and the longitudinally opposite end walls 40a and 40b of slot 40 and, in the case of relative movement of mandrel 26 toward upset portion 16, by shoulder 18. Stop 36 and slot 40 also prevent relative rotation of body 12 and mandrel 26.

Mandrel 26 is also provided with tapped bores 42 in which are received threaded frangible elements 44. Frangible elements 44, which extend inwardly of longitudinal bore 11, have a bore 46 which is open to the exterior of mandrel 26 but is normally closed interiorly thereof. Mandrel 26 is further provided with lateral ports 48 displaced longitudinally upward from bores 42. Sealing between body 12 and mandrel 26 is accomplished by O-rings 50 and 52.

The upper end of mandrel 26 is threaded to form a pin portion 54 which is threadedly received in a box 56 which is connected to and provides open communication between tool 10 and the upper part of the tool string (not shown).

A sleeve member 58 is concentrically disposed inside mandrel 26 at the upper end thereof, sleeve member 58 being normally releasably secured to mandrel 26 by shear pin 60 received in registering bores in mandrel 26 and sleeve member 58. It will be seen that in its normal, unactivated position, sleeve member 58 closes off ports 48, sealing around ports 48 being accomplished by means of O-rings 62 and 64. Sleeve member 58 is also provided with lateral ports 66 whose function will be explained more fully hereafter. A snap ring 68 is normally disposed in an internal annular groove 70 between sleeve 58 and mandrel 26.

Figure 1:
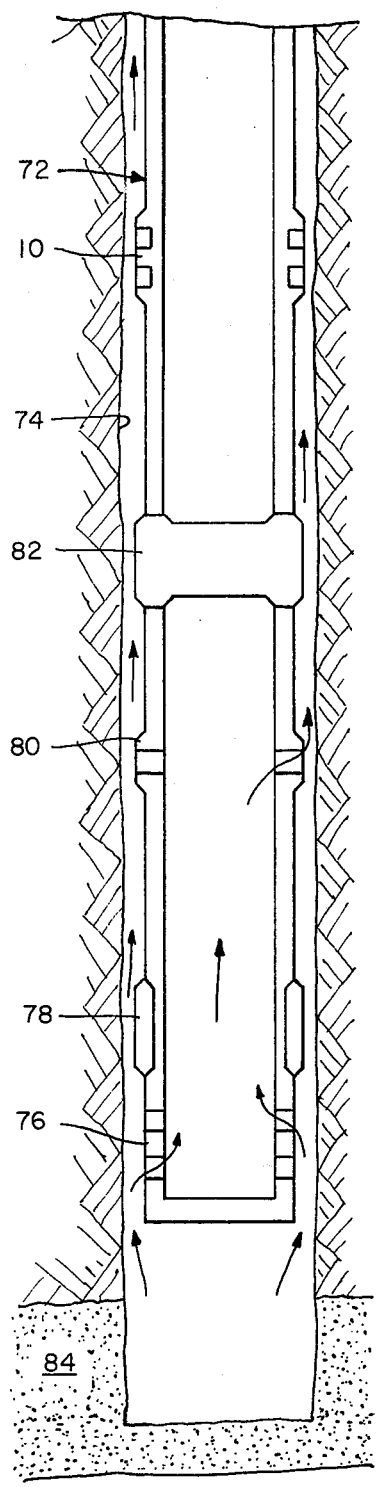
FIGS. 1–5 are schematic figures showing the apparatus of the present invention and fluid circulation paths in the well bore and tool string at various stages in the method of the present invention.

Reference is now made to FIGS. 1–5 for a detailed description of the method of the present invention employing well tool 10. In FIG. 1 the operating tool string, shown generally as 72, is shown being lowered into a well bore 74. While well bore 74 is shown as being open hole, it is to be understood that the method and apparatus of the present invention find application in cased hole as well. Accordingly, the term well bore, as used herein, is intended to means either open or cased hole. A perforated shoe or anchor 76 is connected at the lower part of operating tool string 72. Supported above shoe 76 in tool string 72 is packer 78, a by-pass valve 80 being supported in tool string 72 above packer 78. A valve assembly 82 supported above packer 78 and by-pass valve 80 serves to selectively open and close a flow passage for circulation downwardly through string 72 to shoe 76 and upwardly from shoe 76 through string 72. Well tool 10, which actually forms a second valve assembly, is connected in tool string 72 above valve assembly 82.

It will be understood that the operating tool string 72 will also include apparatus such as jars, safety joints, chokes, pressure recorders and various testing equipment commonly used in drill stem or formation testing and well known to those skilled in the art. Apparatus corresponding to shoe 76, packer 78, by-pass valve 80 and valve assembly 82 is also well known to those skilled in the art and need not be described in detail here.

As seen in FIG. 1, in lowering the operating tool string 72 into bore 74, valve assembly 82 is closed thereby closing well string 72 above valve assembly 82. Fluid from formation 84, to be tested, can thereby flow upwardly around tool string 72 and also through the lower part of tool string 72 below valve assembly 82 but is prevented from flowing into tool string 72 above valve 82.

Under the condition shown in FIG. 1, i.e., while running string 72 into bore 74, well tool 10 will be in the mode shown in FIG. 6. Thus, there will be no lateral flow openings between the interior of tool 10 and well bore 74. Additionally stop 36 will engage wall 40b of slot 40.

Figure 2:
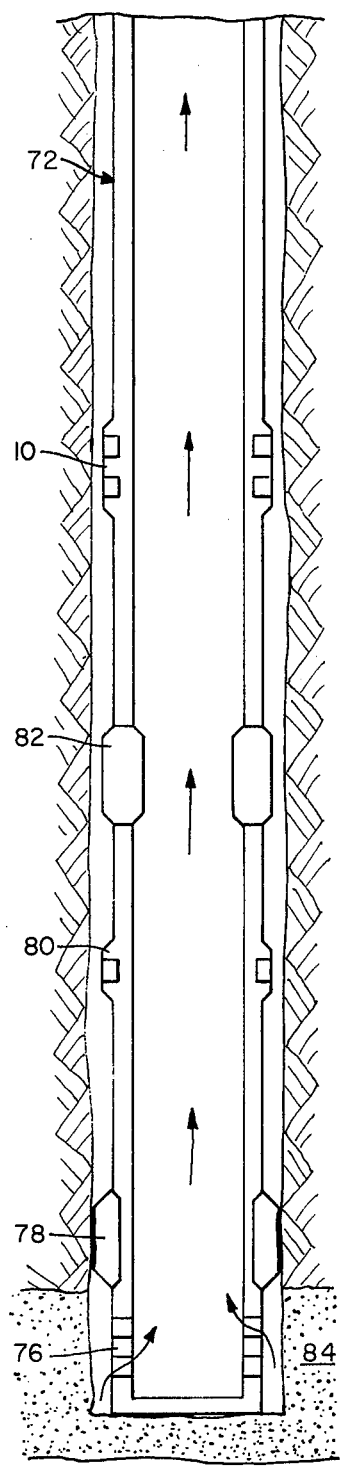

FIG. 2 shows tool string 72 in position in well bore 74 to conduct drill stem or formation pressure testing. It will be seen that perforated shoe 76 is in open communication with formation 84, packet 78 having been set above formation 84. Packer 78, once expanded, serves to support the hydrostatic pressure load of well fluid in the annulus of bore 74, thus relieving formation 84 of this pressure. With packer 78 expanded to provide a seal above formation 84, valve assembly 82 is then opened. The opening and closing of valve assembly 82 can conveniently be carried out by varying the annulus pressure in well bore 74 and valve assemblies for carrying out such procedures are well known in the art. With valve assembly 82 open and by-pass valve 80 closed, formation 84 is thus exposed to atmospheric or reduced pressure in tool string 72. The ability of formation 84 to produce can thus be determined. As is well known, other testing procedures normally used in drill stem or formation testing can also be carried out at this time.

The condition of well tool 10 corresponding to the step of the method of the invention shown in FIG. 2 is seen by reference to FIG. 7. It will now be seen that since the tool string 72 is "sitting down" in bore 74, mandrel 26 will have moved downward in body 12 such that stop 36 now engages end wall 40a of slot 40, (shown in dotted lines in FIG. 6) and the lower end of mandrel 26 engages shoulder 18. Thus, mandrel 26 and body 12 have been relatively axially moved to a first terminal position. It can also be seen by reference to FIG. 7 that ports 14 in body 12 are now in register with bores 46 in frangible elements 44 extending through tapped bores 42 in mandrel 26. At this stage, however, no lateral passageways are open between the interior of tool 10 and the exterior thereof, i.e., into well bore 74.

Figure 3:
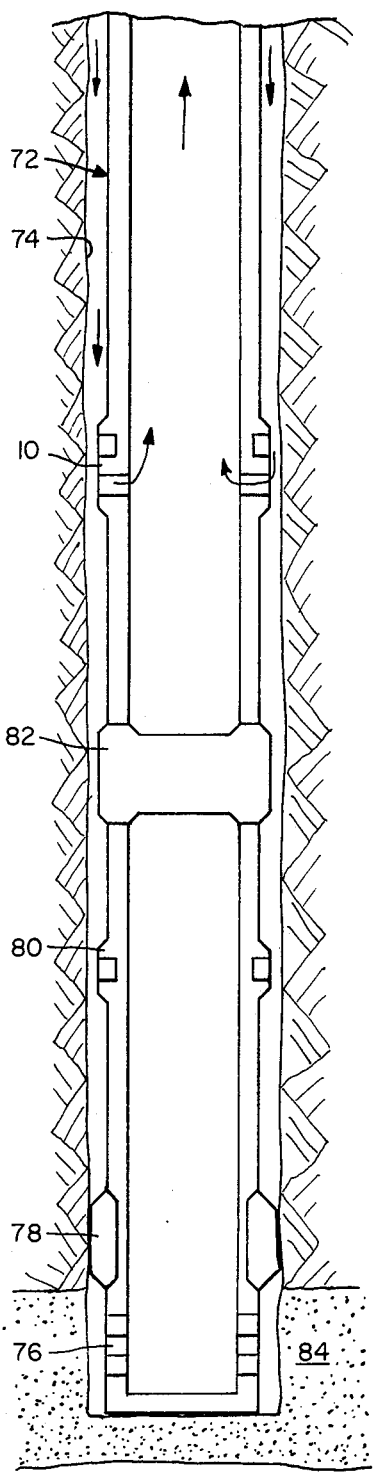

Assuming now that the formation testing has been completed, and it is desired to further treat formation 84, as for example by acidizing, it is first necessary to remove any foreign matter in the operating tool string and drill pipe above by reverse circulation. To accomplish this, valve assembly 82 is closed as shown in FIG. 3 and tool 10 is now actuated to provide a lateral flow path providing communication from the interior of tool string 72 to well bore 74. The manipulation of tool 10 to provide the lateral flow path for reverse circulation is best shown by reference to FIG. 8. A bar or other such object is dropped down tool string 72 resulting in the breaking of frangible elements 44. Breaking of elements 44 opens the closed ends of bores 46 which are in register with ports 14 in body 12. Thus, a lateral flow path between the interior and exterior of tool 10 is formed. Reverse circulating fluid now passes down the annulus between bore 74 and operating tool string 72, thru registering ports 14 and 46, upward through tool 10 and then upward thru string 72. In this manner any foreign matter which may have accumulated in the operating tool string is removed.

Assuming that no further treatment of formation 84 is desired, operating tool string 72 and the assemblage supported thereon can now be removed from the well simply by unseating packer 78, packer 78 being unseated in a well known manner by equalizing the pressure thereacross using by-pass valve 80. Since lateral ports in well tool 10 and by-pass valve 80 are open, once packer 78 is unseated an essentially dry operating string can be pulled from well bore 74.

In the event that it is desired to treat formation 84, as for example by acidizing, packer 78 remains set and well tool 10 is then manipulated to close the first set of lateral ports shown open in FIG. 3, such lateral ports of course being provided by the registering ports 14 in body 12 and bores 46 in mandrel 26.

Closing of this first set of lateral ports can best be understood by reference to FIGS. 6, 8 and 9. A resilient ball 28 (See FIG. 6) is pumped via acidizing or other fluid down string 72 where it seats on the uper end of sleeve member 58. At this point, tool 10 will still be in the position shown in FIG. 8. The pressure of the fluid behind ball 28 is then increased until pin 60 shears. The fluid pressure acting against ball 28, moves sleeve member 58 downwardly (See FIG. 9) until the lower end of sleeve member 58 engages abutment shoulder 30 in mandrel 36. At this point the upper end of sleeve 58 clears snap ring 68 which now contracts inwardly preventing sleeve 58 from moving upwardly. This downward movement of sleeve member 58 seals off ports 46 and hence closes the lateral circulation path from the interior of tool 10 to well bore 74.

Figure 4:
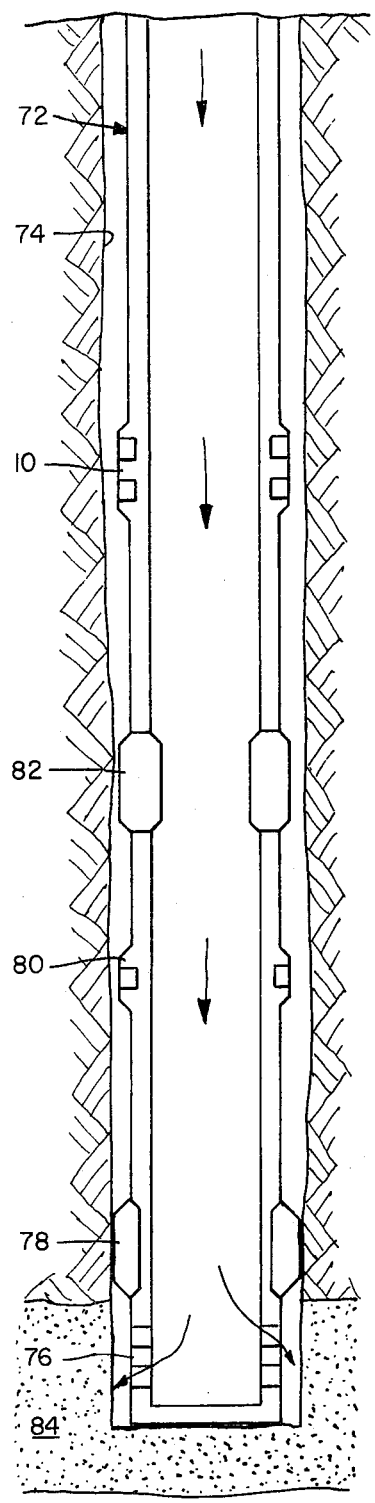
Figure 5:
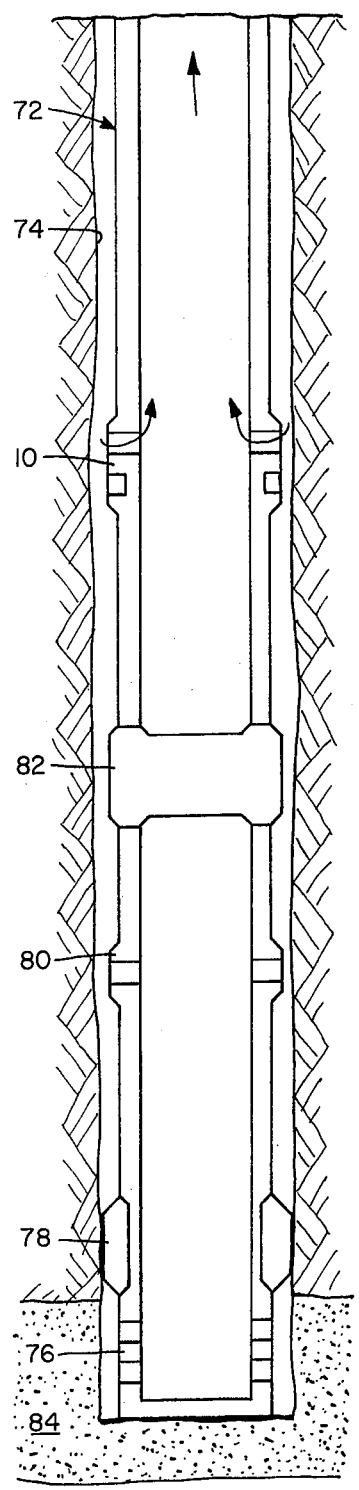

The pressure of the acidizing fluid is then increased sufficiently to force resilient ball 28 through sleeve member 58. Ball member 28 passes downwardly forcing spring loaded latch 32 into the position shown in dotted lines in FIG. 6 and comes to rest on ball catcher 25 (See FIG. 6). It will now be apparent that ball 28 cannot move upwardly through passageway 11, the latter being sufficiently blocked by latch 32 which has returned to its normal position shown in full lines in FIG. 6. With valve 82 now open and by-pass valve 80 closed, the acidizing fluid or other such treating medium is now pumped downwardly through operating tool string 72 and into formation 84 as shown in FIG. 4. The acidizing or other such treatment can be continued for whatever period of time desired after which formation 84 is permitted to flow as shown in FIG. 2 to evaluate the effects of the treatment on the flow capabilities of the formation 84.

Once the acidizing or other treatment has been completed, it is again desirable to reverse circulate operating tool string 72 clean of foreign matter. To accomplish this, it is necessary to open a lateral passageway between bore 74 and the interior of operating tool string 72. It can be seen from FIG. 9 that when sleeve member 58 was moved downwardly into abutment with shoulder 30, lateral orfices 66 in sleeve 58 were placed in register with lateral ports 48 in mandrel 26. However, because of the presence of seal rings 62, 64, 101, 102, 103 and 104, no flow laterally into or out of tool 10 is permitted. Opening of a lateral passageway via ports 48 and 66 from the interior of tool 10 to well bore 74 is accomplished in the following fashion: tool string 72 is moved longitudinally upwardly which in turn moves collar 56 and mandrel 26 upwardly, the latter being slidably mounted in body 12. Body 12, however, being secured to the portion of the tool string supporting packer 78 which is set does not move. Since sleeve 58 is in abutment with shoulder 30 in mandrel 26, the upward movement of mandrel 26 also results in the upward movement of sleeve 58 such that ports 58 and 66 remain in register. As is best seen with reference to FIGS. 6 and 10, when mandrel 26 has been moved upwardly to where stop member 36 engages the upper wall surface 40b of slot 40, port 48 will now clear the upper end of body 12 and a passageway will now be open from the interior of tool 10 via ports 66 and 48 to well bore 74. The tool string can now be reversed circulated clean in the manner shown in FIG. 5.

Once the reverse circulation has been completed, packer 78 can now be unseated by equalizing the pressure thereacross using by-pass valve 80. Lateral ports being open in tool 10, operating tool string 72 can now be pulled from bore 74 as an essentially dry string.

It will thus be seen that the present invention provides a method and apparatus for permitting single trip formation testing and acidizing without the necessity for relative rotation of the down hole assembly. The present invention is, therefore, well adapted to carry out the specific objects mentioned above as well as those inherent therein. While certain preferred embodiments of the method and apparatus have been set forth in the foregoing disclosure, numerous modifications can be made by those skilled in the art without departing from the spirit and scope of the invention which is to be limited only by the appended claims.

I claim:

1. A single trip method of treating a formation in a well bore comprising:
    lowering into said well bore an operating tool string having a packer, a perforated shoe supported below said packer, a first valve means supported above said packer and a second valve means supported above said first valve means;
    setting said packer above said formation,
    manipulating said first valve means to open a flow passage for circulation downwardly through said string, said first and second valve means, said packer and said shoe to said formation, and upwardly from said formation through said shoe, said packer, said first and second valve means and said string for testing said formation.
    manipulating said first vavle means to prevent flow upwardly or downwardly therethrough,
    manipulating said second valve means to open a first lateral flow path providing communication from the interior of said tool string to said well bore,
    reverse circulating a fluid through said first lateral flow path to remove foreign matter,
    manipulating said second valve means to close said first lateral flow path,
    manipulating said first valve means to open said flow passage,
    introducing a treating fluid into said formation,
    manipulating said first valve means to prevent flow upwardly or downwardly therethrough,
    manipulating said second valve means by longitudinal movement of said tool string to open a second lateral flow path providing communication from the interior of said tool string to said well bore, and
    reverse circulating a fluid through said second flow path to remove foreign matter.

2. The method of claim 1 wherein said first valve means is opened and closed by varying fluid pressure in said well bore externally of said tool string.

3. The method of claim 1 wherein said first lateral flow path is opened by breaking a frangible closure element in said second valve means.

4. The method of claim 1 wherein said treating fluid comprises an acidizing fluid.

5. The method of claim 1 wherein said first lateral flow path is closed by longitudinal movement of a slidable valve element in said second valve means.

6. The method of claim 1 wherein said second lateral flow path is formed by longitudinal movement of said operating tool string after said first lateral flow path has been closed.

7. The method of claim 1 further including the step of permitting flow from said formation after said introduction of said treating fluid.

8. The method of claim 7 wherein said treating fluid comprises an acidizing fluid.

9. The method of claim 1 including releasing said packer and removing said operating tool string from said well bore while said second flow path is open.

10. A well tool comprising:
    a generally tubular body having lateral port means,
    a generally hollow mandrel concentrically received in said body, said mandrel having first lateral passageway means, and means for forming second lateral passageway means longitudinally displaced from said first passageway means, said mandrel and said body being mounted for relative axial movement between first and second terminal positions.
    valve means mounted within said mandrel to normally close said first lateral passageway means,
    said valve means being operable to close said second lateral passageway means after said second lateral passageway means and said lateral port means are moved into register by said relative axial movement to said first terminal position and said second lateral passageway means has been formed, said valve means further including means to provide a fluid communication path through said first lateral passageway means between the interior of said tool and the exterior of said tool upon said relative axial movement to said second terminal position.

11. The well tool of claim 10 wherein said means for providing said second lateral passageway means comprises a frangible element projecting inwardly of said mandrel, said frangible element normally closing a lateral opening through said mandrel.

12. The well tool of claim 10 wherein said body has a longitudinally extending slot and there are external stop means connected to said mandrel and projecting outwardly into said slot, said stop means and said slot cooperating to determine said first and second terminal positions.

13. The well tool of claim 10 wherein said valve means comprises a sleeve member axially slidable in said mandrel, said sleeve being normally releasably secured to said mandrel.

14. The well tool of claim 13 wherein said sleeve member is releasably secured to said mandrel by shear pin means.

15. The well tool of claim 13 wherein said mandrel includes internal stop means to limit the longitudinal movement of said sleeve member from said releasably secured condition and said sleeve member is provided with lateral orifice means, said lateral orifice means being registerable with said first lateral passageway means when said sleeve member abuts said internal stop means.

16. The well tool of claim 15 wherein said internal stop means comprises an annular shoulder internally of said mandrel.

17. The well tool of claim 15 including means to prevent said sleeve member from moving in a direction opposite from said internal stop means when said sleeve number abuts said internal stop means.

18. The well tool of claim 17 wherein said means for preventing said movement comprises a snap ring disposed in an internal annular groove in said mandrel.

19. The well tool of claim 13 wherein said sleeve member has an internal diameter sufficiently small to prevent passage of a resilient ball upon application of a first fluid pressure and sufficiently large to permit passage of said ball at a second increased fluid pressure.

20. The well tool of claim 19 wherein said tubular body includes means for trapping said ball.

21. Apparatus adapted for attachment to a tool string to be lowered into a well bore for treating a formation in said well bore comprising a packer, a perforated shoe supported below said packer, first conduit means connecting said perforated shoe and said packer, first valve means supported above said packer, second conduit means connecting said first valve means and said packer, second valve means supported above said first valve means, third conduit means connecting said first and second valve means, said first valve means being operative to selectively provide a flow passage for circulation downwardly through said first and second valve means, said packer to said shoe and upwardly from said shoe through said packer and said first and second valve means, said second valve means including means to provide a first lateral flow path from the interior of said second valve means to said well bore and means to provide a second lateral flow path from the interior of said second valve means to said well bore when said first lateral flow path is closed and said tool string is moved longitudinally.

22. The apparatus of claim 21 wherein said second valve means comprises:
   a generally tubular body having lateral port means,
   a generally hollow mandrel adapted to be connected to said tool string and telescopically received in said body, said mandrel having first lateral passageway means and means for providing second lateral passageway means displaced longitudinally downwardly from said first lateral passageway means, said mandrel and said body being mounted for relative axial movement between first and second terminal positions,
   a slide valve assembly mounted within said mandrel to normally close said first lateral passageway means,
   said slide valve assembly being operable to close said second lateral passageway means after said second lateral passageway means and said lateral port means are moved into register by said relative axial movement to said first terminal position, said slide valve assembly further including means to provide a fluid communication path through said lateral port means between the interior of said second valve means and the exterior of said second valve means upon said relative axial movement to said second terminal position.

23. The apparatus of claim 22 wherein said means for providing said lateral passageway means comprises a frangible element projecting inwardly of said mandrel, said frangible element normally closing a lateral opening through said mandrel.

24. The apparatus of claim 22 wherein said slide valve assembly comprises a sleeve member axially slidable in said mandrel, said sleeve member being normally releasably secured to said mandrel.

25. The apparatus of claim 24 wherein said sleeve member is releasably secured to said mandrel by shear pin means.

26. Apparatus of claim 24 wherein said mandrel includes internal stop means to limit the longitudinal movement of said sleeve member from said releasably secured condition and said sleeve member is provided with a lateral orifice means, said lateral orifice means being registerable with said first lateral passageway means when said sleeve member abuts said internal stop means.

* * * * *

UNITED STATES PATENT AND TRADEMARK OFFICE
CERTIFICATE OF CORRECTION

PATENT NO. : 4,031,957
DATED : June 28, 1977
INVENTOR(S) : Lawrence Sanford

It is certified that error appears in the above-identified patent and that said Letters Patent are hereby corrected as shown below:

In Column 1, line 30, insert the word --production-- after the word "stimulate".

In Column 3, line 28, delete the word "seal" and insert therefor the word --seat--.

In Column 3, line 48, delete the word "intersection" and insert therefor the word --interaction--.

In Column 4, line 19, delete the word "means" and insert therefor the word --mean--.

In Column 4, line 57, delete the word "packet" and insert therefor the word --packer--.

In Column 5, line 61, delete the word "uper" and insert therefor the word --upper--.

Column 7, line 51, after the word "longitudinal" insert -- upward --.

Signed and Sealed this

Tenth Day of January 1978

[SEAL]

Attest:

RUTH C. MASON
*Attesting Officer*

LUTRELLE F. PARKER
*Acting Commissioner of Patents and Trademarks*